June 10, 1958 W. H. BASELT 2,838,143
RAILWAY BRAKE LINKAGE SAFETY SUPPORT
Filed Sept. 27, 1954 2 Sheets-Sheet 1

INVENTOR.
Walter H. Baselt
BY Walter L. Schlegel, Jr.
Atty.

INVENTOR.
Walter H. Baselt
BY
Walter L. Schlegel Jr. Atty.

United States Patent Office 2,838,143
Patented June 10, 1958

2,838,143

RAILWAY BRAKE LINKAGE SAFETY SUPPORT

Walter H. Baselt, Flossmoor, Ill., assignor to American Steel Foundries, Chicago, Ill., a corporation of New Jersey Application September 27, 1954, Serial No. 458,594

1 Claim. (Cl. 188—210)

The invention relates to a railway car truck brake arrangement and particularly to a novel safety arrangement associated therewith.

In most railway car truck brake arrangements, brake levers are pivotally connected directly to a braking device, such as a brake head or a brake beam having brake heads mounted thereon. A power source is usually mounted at some point on the truck remote from the point of brake application. Power for the brake application is transmitted from the power source to the brake levers by means of interconnected brake levers and frame mounted auxiliary levers having a plurality of pull rods interconnecting the various levers. The pull rods usually have their opposite ends pivotally pin connected to the associated auxiliary or brake levers. In many cases the pull rods are located in the lower areas of the truck immediately above the track and road bed. It has been found that upon fracture of the pivotal pin connections, especially the connection involving pull rods in the lower areas of the truck, that the rods will fall to the track and present a potential source of accidents and resulting derailment as well as render portions of the brake arrangement inoperative.

Accordingly, it is a primary object of the invention to provide a railway brake arrangement and especially a connection arrangement between operating members of the brake arrangement having associated therewith safety means to prevent the deassociation of the members in the event of failure of the primary pivotal connections.

It is an additional object of the invention to provide a safety connection between certain levers and the pull rods pivotally operative therewith.

It is a specific object of the invention to provide a safety connection between a brake lever associated with a brake beam and a lever connected pull rod, wherein the arrangement is employed on a railway freight car truck.

These and other objects of the invention will become apparent in the course of the following description and from an examination of the concerned drawings, wherein:

Figure 4 is a fragmentary top plan view illustrating another embodiment of the invention.

Figure 1:
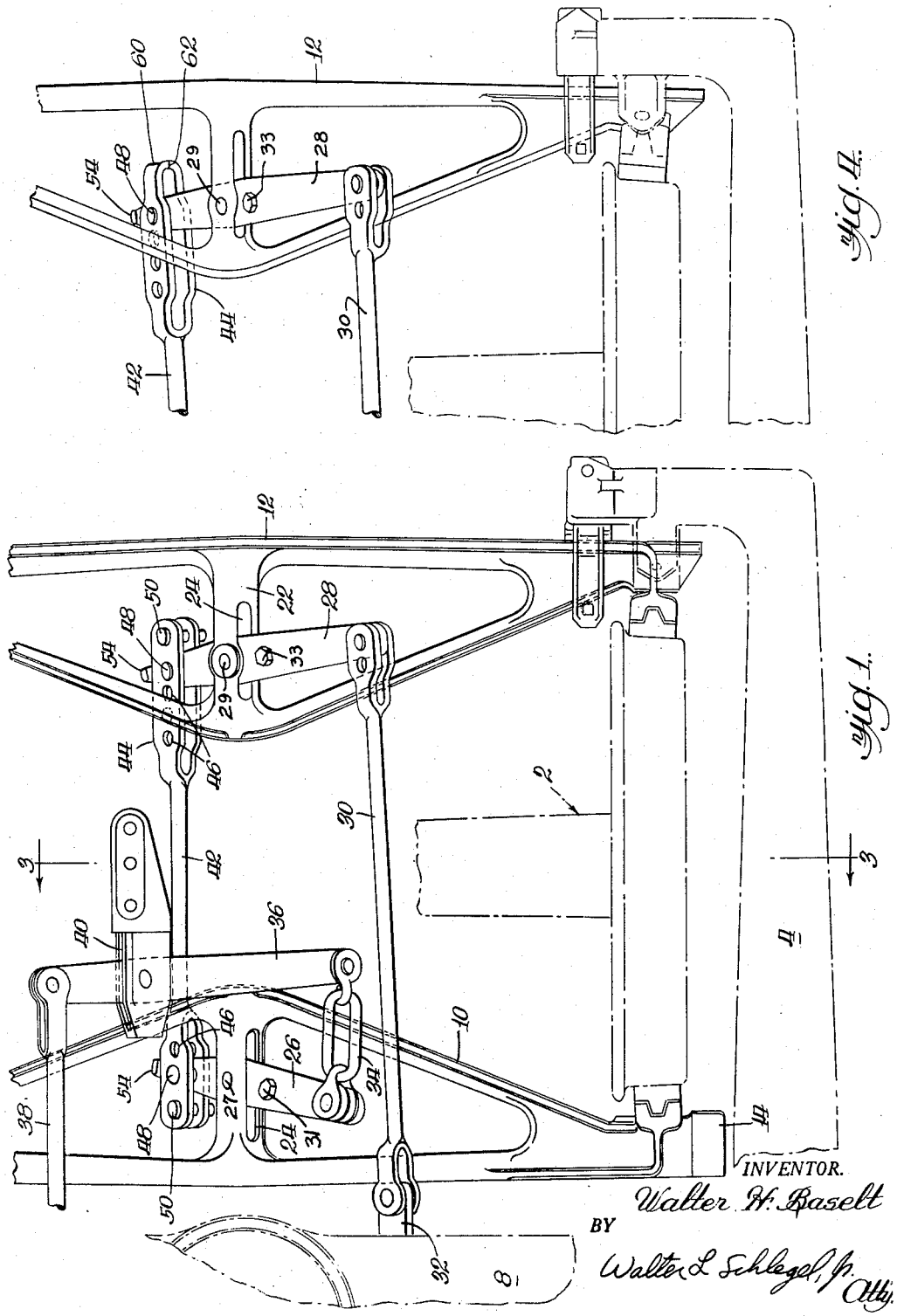
Figure 1 is a fragmentary top plan view of a railway freight car truck brake arrangement employing the invention.

Describing the invention in detail, the railway truck comprises a wheel and axle assembly, indicated generally at 2. A side frame 4 is supported from the wheel and axle assembly immediately outboardly of the wheel in the conventional manner. The side frame 4 comprises depending pedestals 6, 6, said pedestals embracing a journal box (not shown) associated with the outboard extremity of the wheel and axle assembly 2. It will be noted that another side frame 4 is carried from the assembly on the opposite side of the truck, said other side frame not being illustrated in view of the fact that the truck is symmetrical about its longitudinal axis. A bolster 8 is arranged to extend transversely of the truck and is spring supported at its opposite ends (not shown), in the usual manner, from the side frame 4.

A braking arrangement is provided on the truck, said arrangement comprising brake beams 10 and 12 disposed on opposite sides of the wheel and axle assembly 2. The brake beam 10, located inboardly of the assembly, is provided with guide lugs 14 at its opposite ends, said guide lugs being received within frame carried slots (not shown) which serve as primary support for the brake beam 10 and additionally serve to guide the brake beam linearly into and out of engagement with the threads of the associated wheel, as will hereinafter be more fully described. The brake beam 12 is located on the outboard side of the assembly and is provided with a plurality of hangers 16 and 18 at its opposite ends, said hangers having their lower ends pivotally connected to the beam and the upper ends pivotally supported in a bracket 20 carried by the frame 4. The brake beam 12 is thus arranged to move arcuately into frictional engagement with the tread of the associated wheels under the action hereinafter described. The beams 10 and 12 present struts 22 centrally thereof, each center strut 22 having a slot 24 formed therein to receive a brake lever.

Brake levers 26 and 28 are pivotally mounted on the struts of their respective brake beams 10 and 12 by means of pivot pins 27 and 29, respectively. The brake levers 26 and 28 are provided with safety abutment means 31 and 33, respectively, above their respective pivot pins for abutting engagement against their respective struts in the event of failure of said pivot pins, the abutment means being shown in the form of bolts. A mounting rod 30 has one end pivotally connected to the upper extremity of the brake lever 28 and has the other end pivotally mounted on a lug 32 carried by the bolster 8. The upper extremity of the brake lever 26 is link connected as at 34 to one end of an actuating lever 36. The other end of the actuating lever is connected to a force transmitting rod 38, said transmitting rod extending to the other half of the truck (not shown) where it operatively connects with a brake arrangement identical with that disclosed in the figures. The mid-portion of the lever 36 is connected via the member 40 to a conventional brake actuating linkage (not shown) which operatively extends to a power source (not shown) as will be well understood by those skilled in the art.

A pull rod 42 extending generally longitudinally of the truck is preferably disposed below the general horizontal plane of the brake beams 10 and 12. The pull rod 42 is bifurcated at its opposite ends whereat it presents spaced plates 44, 44. Each bifurcated end portion is provided with a plurality or sets of pivot holes 46. The lower ends of the brake levers 26 and 28 may be pivotally pin connected as at 48 to any one of the several sets of pivot holes. The set of pivot holes adjacent the ends of the rod is provided with a pin 50, said pin 50 being arranged to close the ends of the respective bifurcated portions.

Figure 3:
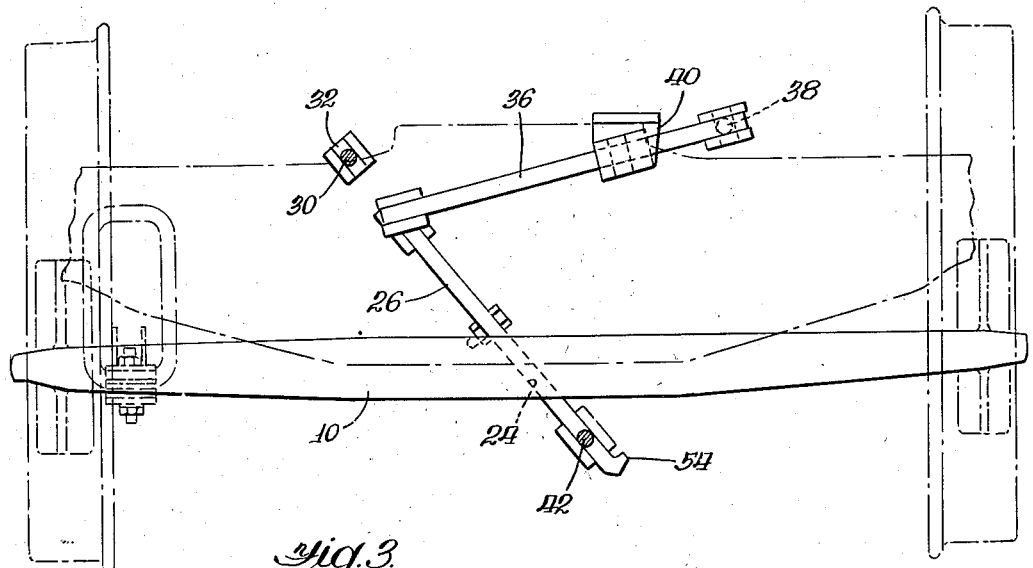
Figure 3 is a fragmentary sectional view taken along line 3—3 of Figure 1.

The brake levers 26 and 28 each present on the lower extremity thereof fingers 54, said fingers 54 being angularly arranged relative to the flat main portion of the respective brake levers. Directing attention to Figure 3, it will be seen that the lower end of the brake levers is closely fitted or embraced within the spaced plates 44 of the bifurcated end portions of the pull rod 42. It will also be noted that the finger 54 being angularly arranged relative to the associated lever extends outwardly toward the edge of one of the plates of the bifurcated end portions and in effect overlaps the plate though slightly separated therefrom.

In the event of failure of the primary pivot connection between the lower ends of the brake levers and pull rod, such as the breaking of the pin 48, the pull rod 42 will not fall to the track or road bed and drag on the road bed surface. The rod 42 will move down a short distance only until it contacts the finger or abutment 54 which will prevent further vertical separation of the respective brake levers and pull rod 42. Additionally, the presence of the pins 50 in the holes at the outboard extremity of the bifurcated portions on the pull rod 42 prevents the levers 26 and 28 from being pulled outwardly and generally horizontally beyond the ends of the bifurcated portions during the actuation of the brake linkage.

Attention is now directed to Figure 4, which illustrates a slight embodiment of the invention. In the embodiment of Figure 4, the general brake arrangement is substantially the same. Again the brake lever 28 is pivotally connected to a bifurcated end portion of the end pull rod 42. The lever 28 is also provided with a finger 54 at its lower end and angularly related to the lever 28 in such manner as to prevent the pull rod and particularly the bifurcated end portions from vertically separating in the event of failure of the primary pivotal connection. The end segment 60 of the bifurcated end portion, however, is arcuately formed to close the slot formed by the bifurcated end portion. It will be noted that the end portion may be slit, as at 62, whereby the plates 44 of the end portion may be separated slightly to provide for the assembly of the brake lever 28 and the slot formed by the plates 44. The edges at the slit 62 may be placed together and tack welded to complete closure of the slot. Thus the embodiment of Figure 4 differs from the embodiment of Figures 1 to 3 by providing an integral slot having both ends closed instead of providing for closure of one end of the slot by a pin, as was done in the before mentioned embodiment.

Figure 2:
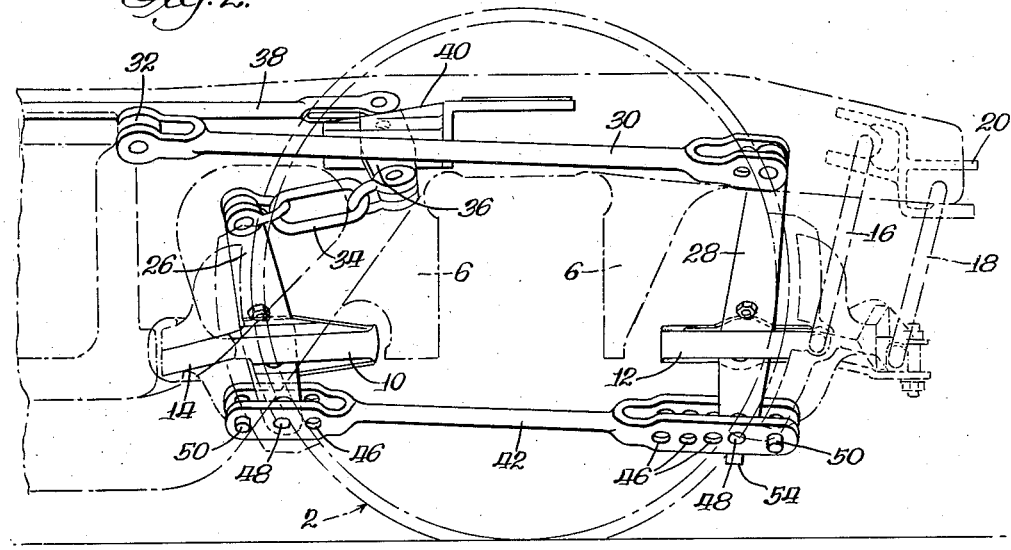
Figure 2 is a side elevational view of the structure shown in Figure 1.

Considering the operation of the brake arrangement, member 40 is moved to the right, as seen in Figure 1, whereby the actuating lever 36 is also carried to the right in turn carrying the brake lever 26 in a clockwise direction, as seen in Figure 1. The movement of the brake lever 26 causes leftward movement of the pull rod 42 and urges the brake beam 10 to move to the right until the brake beam and friction means carried thereon contact the assembly wheels. Movement of the pull rod 42 to the left causes a counterclockwise pivoting of the brake lever 26 about its connection to the beam 12. This movement causes the beam 12 to move to the left, whereby its carried friction means engages the wheels of the associated assembly. It will be noted then that the pull rod 42 moves to the left and the brake lever 26 moves in a counterclockwise direction. Thus assuming a failure of the primary pivotal pin connections 48, the brake arrangement will still be operative in a brake engaging direction. Assuming this condition to exist, the moving of the lever 36 causes the brake lever 26 to pivot in a counterclockwise direction until it engages the slot pin 50 at which point the motion moves the pull rod 42 to the left.

Movement of the rod 42 to the left causes engagement between the pin 50 at the right hand end of the rod 42 and the brake lever 28, whereby the brake lever 28 is urged to pivot in a counterclockwise direction and bring the brake beam 12 into engagement with the wheels.

While the deactuation of the brakes is not accompanied by immediate positive movement through used linkage, it will be readily appreciated by those familiar with the art that if the brakes are deactuated, the action of the wheels will tend to throw the brakes to a non-engaging position. In any event, the brake arrangement and particularly the safety means provided in the connections between the brake levers and lower pull rod 42, assures positive brake actuation in the event of the failure of the primary pivotal connections in addition to preventing the pull rod 42 from falling to the road bed and offering a potential source of accidents.

I claim:

In a brake rigging, a closed brake beam having a slotted strut, a brake lever extending downwardly through said closed slot, said brake lever being pivotally connected to said brake beam, safety abutment means comprising a nut and bolt secured to the brake lever above the pivotal connection to engage the brake beam in the event of failure of the pivotal connection, said nut and bolt being readily releasable to facilitate assembly and disassembly of the brake lever from the brake beam slot, said brake lever comprising an abutment rigidly secured to the lower end thereof, a pull rod having spaced plates at the end thereof, said plates being pivotally connected to the lower end of the brake lever, the last-mentioned abutment engaging the pull rod in the event of failure of the last-mentioned pivotal connection, and other means interconnecting the outer ends of the spaced plates, said other means preventing separation of the brake lever and pull rod.

References Cited in the file of this patent

UNITED STATES PATENTS

| | | |
|---|---|---|
| 1,699,650 | Willoughby | Jan. 22, 1929 |
| 1,747,875 | McGahey | Feb. 18, 1930 |
| 1,751,661 | Schaefer | Mar. 25, 1930 |
| 1,871,979 | Gayan | Aug. 16, 1932 |
| 2,354,973 | Baselt | Aug. 1, 1944 |